United States Patent
Nickell et al.

(10) Patent No.: US 7,451,439 B2
(45) Date of Patent: Nov. 11, 2008

(54) SYSTEM AND METHOD FOR AUTOMATICALLY IDENTIFYING COMPOUND REFACTORINGS OF PROGRAM CODE THROUGH QUANTITATIVE METRIC ANALYSIS

(75) Inventors: Eric Stephen Nickell, Los Gatos, CA (US); Ian E. Smith, Seattle, WA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 522 days.

(21) Appl. No.: 11/003,202

(22) Filed: Dec. 3, 2004

(65) Prior Publication Data

US 2006/0123384 A1   Jun. 8, 2006

(51) Int. Cl.
*G06F 9/45* (2006.01)
(52) U.S. Cl. .................. 717/159; 717/136; 717/140
(58) Field of Classification Search ............... 717/100, 717/126, 136, 140, 159
See application file for complete search history.

(56) References Cited

U.S. PATENT DOCUMENTS

| | | | | |
|---|---|---|---|---|
| 6,804,682 | B1* | 10/2004 | Kemper et al. | 707/103 R |
| 6,807,548 | B1* | 10/2004 | Kemper | 707/103 R |
| 7,076,762 | B2* | 7/2006 | Fisher | 717/102 |
| 7,076,764 | B2* | 7/2006 | Kramer | 717/120 |
| 2003/0188291 | A1* | 10/2003 | Fisher | 717/102 |
| 2004/0040017 | A1* | 2/2004 | Kershenbaum et al. | 717/158 |
| 2005/0166193 | A1* | 7/2005 | Smith et al. | 717/143 |

OTHER PUBLICATIONS

Amey, Peter, Chapman, Roderick. "Static Verification and Extreme Programming" Proceedings of the 2003 annual ACM SIGAda international conference on Ada: the engineering of correct and reliable software distributed systems using ada and related technologies. (2004) 4-9.*

Li, Huiging, Reinke, Claus, Thompson, Simon. "Tool support for refactoring functional programs" Proceedings of the 2003 ACM SIGPLAN workshop on Haskell (2003) 27-38.*

Noonan, Robert, Prosl, Richard. "Unit testing frameworks" Technical Symposium on Computer Science Education Proceedings of the 33rd SIGCSE technical symposium on Computer science education. (2002) 232-236.*

M. Fowler, "Refactoring Improving The Design Of Existing Code," Chs. 6-12, Addison-Wesley (1999).

* cited by examiner

*Primary Examiner*—Wei Y. Zhen
*Assistant Examiner*—Matthew J Brophy
(74) *Attorney, Agent, or Firm*—Patrick J.S. Inouye; Krystyna Szul

(57) ABSTRACT

A system and method for automatically identifying compound refactorings of program code through quantitative metric analysis is presented. Program code is maintained, including program statements written in accordance with a programming language and defining operations executed following transformation into machine code. Compound refactorings are built. The program code is refactored by evaluating one or more of the program statements against a compound refactoring including a set of one or more individual refactorings. The application of the refactorings to the program statements is validated for each evaluated refactoring. A quantitative measure is analyzed against a threshold to reflect a relative difference between the program statements prior to and after application of the refactorings.

23 Claims, 7 Drawing Sheets

45

```
string key = tok.next ();
if (key.equals ("DESC") ) {something ( ); }
    •
    •
    •
string key = tok.next ();
if (key.equals (foo ( ) ) ) {something ( ); }
    •
    •
    •
```

```
string key = tok.next ( );
string temp1 = "DESC";
if (key.equals (temp1) ) {something ( ); }
    •
    •
    •
string key = tok.next ( );
string temp1 = foo ( );
if (key.equals (temp1 ) ) {something ( ); }
    •
    •
    •
```

```
string temp1 = "DESC";
string key = tok.next ( );
if (key.equals (temp1) ) {something ( ); }
        •
        •
        •
string temp1 = foo ( );
string key = tok.next ( );
if (key.equals (temp1 ) ) {something ( ); }
        •
        •
        •
```

FIG. 6

SYSTEM AND METHOD FOR AUTOMATICALLY IDENTIFYING COMPOUND REFACTORINGS OF PROGRAM CODE THROUGH QUANTITATIVE METRIC ANALYSIS

FIELD

This application relates in general to program code refactoring and, in particular, to a system and method for automatically identifying compound refactorings of program code through quantitative metric analysis.

BACKGROUND

Commercial software development is a maturing discipline, which has historically been characterized by divergent approaches to design, coding, testing, and maintenance. Extreme programming, one of several emerging, so-called "agile methodologies," attempts to unify the software development cycle into a holistic process to improve code quality and product viability, such as described in K. Beck, "Extreme Programming Explained: Embrace Change," Addison-Wesley (2000), the disclosure of which is incorporated by reference. Extreme programming is practiced through simple design, small releases, metaphors, testing, refactoring, pair programming, and continuous integration.

Extreme programming adopts refactoring to facilitate the process of adding features to existing code. However, refactoring is not exclusive to extreme programming and can be applied to other software development methodologies. Refactoring is defined as the process of changing software such that the changes do not alter the external behavior of the code, yet improve the internal code structure. As a result, refactoring improves code design after the code has been written by removing duplication, improving communication, simplifying structure, and adding flexibility.

Refactoring is conventionally applied to code as a structured, yet subjective methodology. In the general case, refactoring is as creative a process as the development of original program code. The critical points that distinguish general programming and refactoring are that: (1) the needed functionality is not changed as the result of the software changing, and (2) the software is improved in some way, such as being smaller, simpler, or made amenable to a subsequent development. Although refactoring can be applied to all forms of structured program code, refactoring is most effectively applied to object oriented code, preferably within the context of a testing framework. Refactoring can involve selecting and restructuring code according to well-accepted refactoring rules, such as listed in the catalogue of refactoring rules described in M. Fowler, "Refactoring Improving The Design Of Existing Code," Chs. 6-12, Addison-Wesley (1999), the disclosure of which is incorporated by reference. The validity of refactoring rules can be determined through testing or semantic proofs, which can also be subject to assumptions regarding the code.

Ideally, refactoring should be applied as a continuous process integral to the overall software development cycle. Identifying opportunities within code to apply refactoring is nevertheless subjective and relatively ad hoc, involving visual inspection and manual rewritings of code. Moreover, the set of refactoring rules chosen tends to be highly dependent upon the experience and preferences of the developers involved.

Typically, automated refactoring methodologies are designed to provide overall improvements in program structure through human-initiated or computer-assisted editing of program code. These methodologies often serve as an editing "Wizard" for programmers that already know about the program code and structure. The programmer is usually applying a fair bit of insight and knowledge to tell the automated refactoring tool where and what to do. As a result, individual refactoring rules are defined in terms of achieving specific restructuring goals. For example, one widely-used refactoring rule to remove code duplication involve identifying duplicated program statements, which are promoted into a new method and replaced by calls on the newly-formed method. When applied individually, refactoring rules provide improved code, but the improvements are generally viewed in isolation from other potential changes that could be made possible through the application of further refactoring rules. Moreover, attempting multiple combinations of refactorings can quickly become cost prohibitive, particularly where the refactorings are selected and applied through manual means, as each refactoring requires identifying rules, applying the rules and validating the resulting refactored code. Furthermore, not every combination of refactorings is worthwhile. Accurately gauging relative improvements can be difficult, for instance, where several refactorings must be combined and only the last refactoring shows a measurable change in the improvement metrics, whereas the other refactorings are merely enablers.

Therefore, there is a need for a computer-initiated or computer-suggested editing approach to automatically identifying suitable combinations of refactorings for code by applying quantitative measures reflecting relative improvement over candidate constituent refactorings. Preferably, such an approach would provide validation of refactorings through a range of acceptance criterion and would allow accommodate selectable refactoring search strategies.

SUMMARY

One embodiment provides a system and method for automatically identifying compound refactorings of program code through quantitative metric analysis. Program code is maintained, including program statements written in accordance with a programming language and defining operations executed following transformation into machine code. Compound refactorings are built. The program code is refactored by evaluating one or more of the program statements against a compound refactoring including a set of one or more individual refactorings. The application of the refactorings to the program statements is validated for each evaluated refactoring. A quantitative measure is analyzed against a threshold to reflect a relative difference between the program statements prior to and after application of the refactorings.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIGS. 4-6 are block diagrams showing, by way of example, pseudo code for a series of compound refactorings.

DETAILED DESCRIPTION

Development Environment

Figure 1:
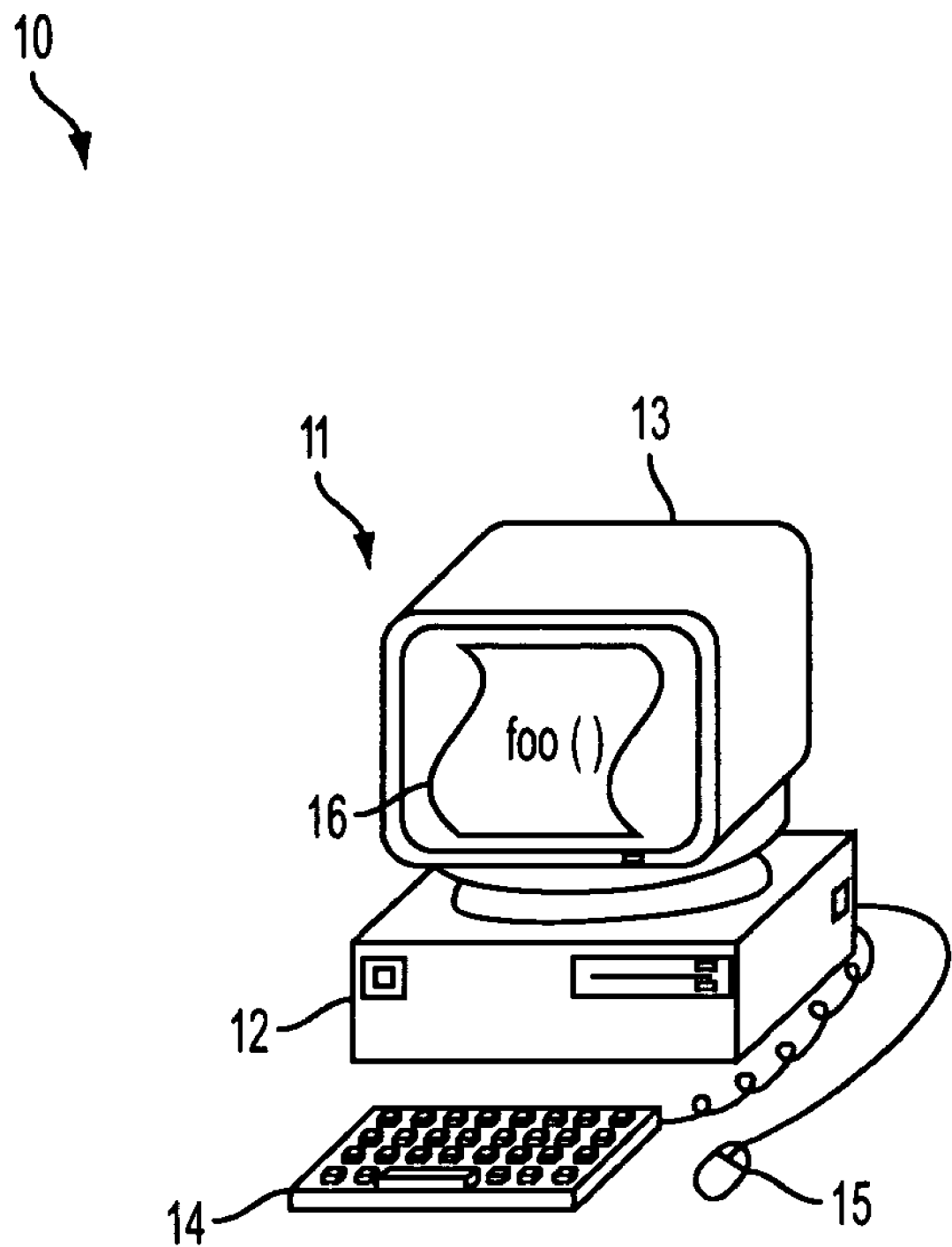
FIG. 1 is a block diagram showing, by way of example, a development workstation upon which to execute automated refactorings.

FIG. 1 is a block diagram 10 showing, by way of example, a development workstation 11 upon which to execute automated refactorings. Program code 16 is written in accordance with the programming language on a development platform 11 and is refactored through a refactoring engine that identifies compound refactorings, as further described below with reference to FIG. 3.

Preferably, the development platform 11 is a general-purpose computer executing an operating system and providing an application development environment. The development platform 11 includes components conventionally found in a personal computer, such as, for example, a central processing unit (CPU) 12, display 13, keyboard 14, mouse 15, and various components for interconnecting these elements. Further user interfacing means for inputting and displaying information from and to a human developer could also be provided. Program code, including software programs, and data is loaded into memory for execution and processing by the CPU and results are generated for display, output, transmittal, or storage.

Process Flow

Figure 2:
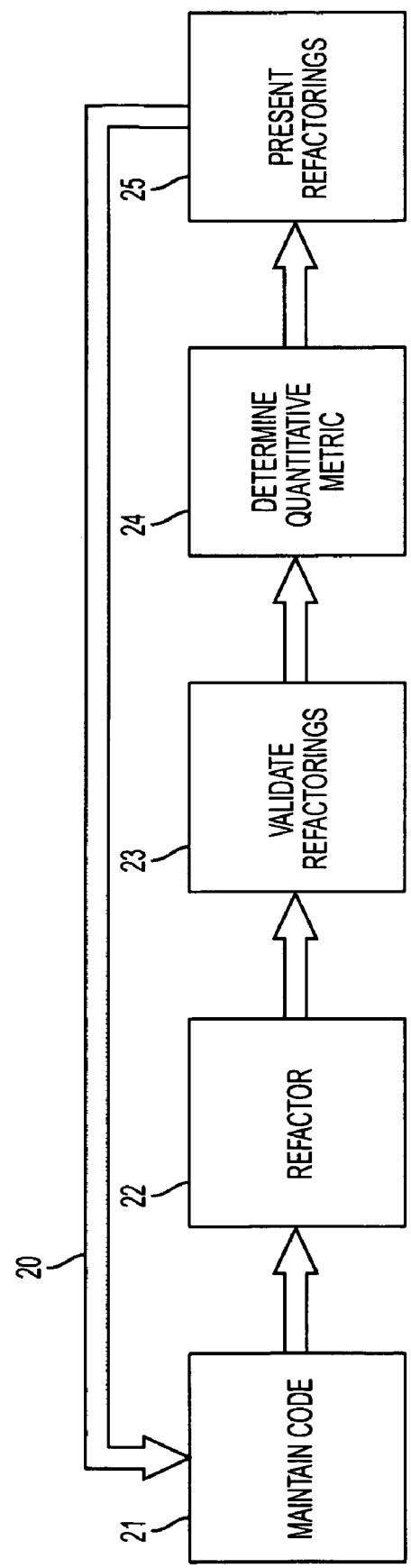
FIG. 2 is a process flow diagram showing the identification of effective compound refactorings of program code through quantitative metric analysis in accordance with one embodiment.

FIG. 2 is a process flow diagram 20 showing the identification of effective compound refactorings of program code 16 through quantitative metric analysis in accordance with one embodiment. Processing occurs as an iterative series of five stages presented to developers as a computer-initiated or computer-suggested editing methodology. Initially, the program code 16 is maintained (operation 21), generally as part of a software development project by a team of developers, who design, code, test and maintain the program code 16 within an integrated development environment. Periodically, the program code 16 is automatically refactored (operation 22) by applying one or more refactorings selected from a set of refactoring rules, both standard and non-standard, maintained in a repository of compound refactorings. Each constituent refactoring is validated (operation 23), such as by applying a proof, static analysis or test suite. If the refactoring successfully validates, one or more quantitative software metrics are determined (operation 24) reflecting a relative difference or improvement, if any, between the program code 16 prior to and following the refactoring. Acceptable refactorings can be periodically presented to the developers (operation 25) or marked as potentially promising candidate refactorings for use in further refactorings. Processing (operations 21-25) can be iteratively repeated as necessary.

Software Modules

Figure 3:
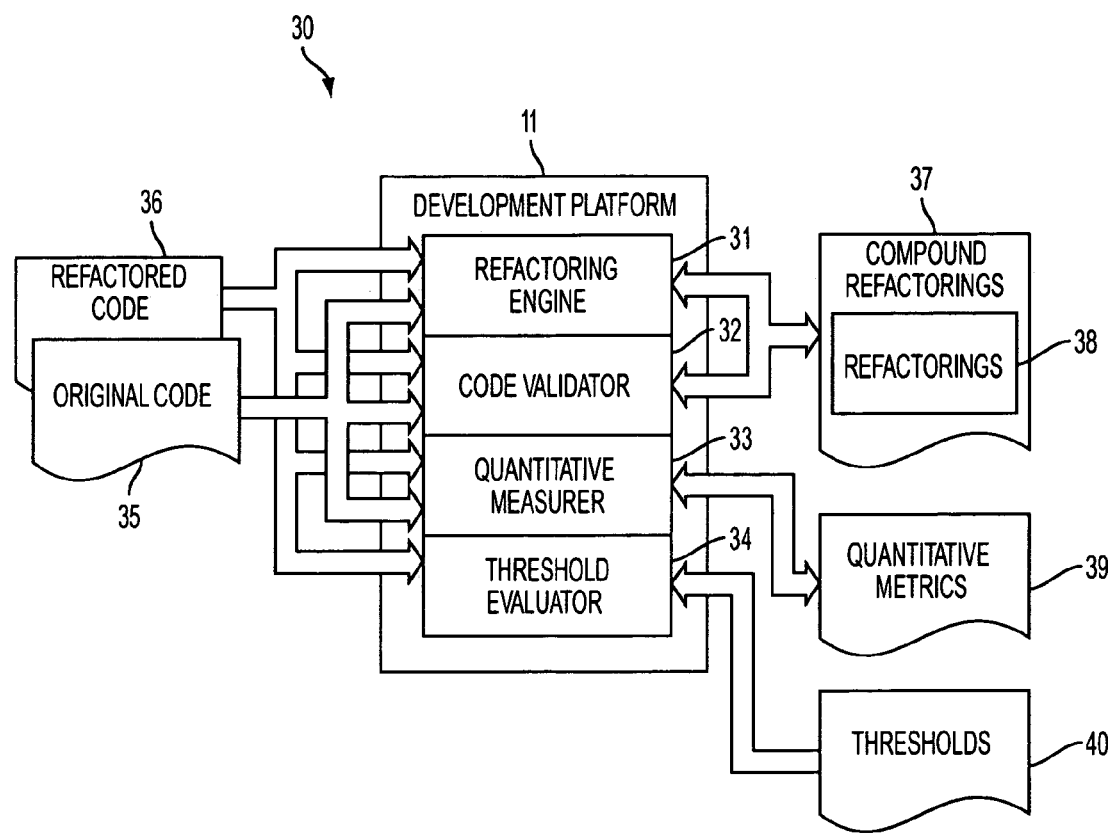
FIG. 3 is a functional block diagram showing software modules for automatically identifying compound refactorings of program code, such as used in the system of FIG. 1.

FIG. 3 is a functional block diagram 30 showing software modules for automatically identifying compound refactorings of program code 16, such as used in the system of FIG. 1. The development platform 11 includes a refactoring engine 31, code validator 32, quantitative measurer 33, and threshold evaluator 34 and also maintains a repository of compound refactorings 37, which each contain zero or more simple refactorings 38. The repository is initially seeded with a single compound refactoring 37 with zero simple refactorings 38.

The refactoring engine 31 automatically applies refactorings to original program code 34 whenever needed to produce refactored code 36 and further compound refactorings 37. Each individual refactoring 38 specifies improvements to the internal structure of the code without changing the external behavior of the code during execution. The refactorings 38 can be selected from a catalogue, such as described in M. Fowler, supra., and can also include other refactoring rules, both standard and non-standard, specified by the developers, including individual refactorings, which can be proven semantically correct or testably correct. The refactoring engine 31 selects a potentially promising compound refactoring 37 along with one or more individual refactorings 38, which are compounded to create further compound refactorings 37.

The code validator 32 validates the refactored code 36, such as by applying a proof, static analysis, test suite, or through speculative refactoring, such as described in commonly-assigned U.S. patent application, Ser. No. 11/003,254, filed Dec. 3, 2004, pending, the disclosure of which is incorporated by reference. The code validator 32 determines whether compound refactoring 37 that generated the refactored code 36 are allowed to be placed into the repository.

The quantitative measurer 33 and threshold evaluator 34 analyze changes that result from the application of refactorings 38 to the program code. The quantitative measurer 33 evaluates the potential of each new compound refactoring 37 by determining the difference in quantitative metric 39 between the actual and potential differences of the original code 35 and refactored code 36. The threshold evaluator 34 generates at least two types of quantitative metrics 39 that reflect any improvement, degradation or status quo. First, the refactored code 36 can be measured against a threshold 40 to determine, for instance, whether the refactoring 38 should be presented to the developer. In a further embodiment, two or more refactorings 38 can be compared and measured against the threshold 40. Second, a particular line of refactorings 38 can be measured to assess the promise that those refactorings 38 might eventually pass the threshold 40. This second quantitative metric 39 can serve as an estimator of future refactoring potential or goal-driven hill climbing refactoring methodologies. Following evaluation, the quantitative metrics 39 and associated compound refactorings 37 are stored. Specific examples of quantitative measures include, nonexclusively, cyclometic complexity, and cohesion and coupling. Other types of quantitative metrics 39 are possible.

Compound Refactoring and Graphical Search Space Examples

FIGS. 4-6 are black diagrams showing, by way of example, pseudo code for a series of compound refactorings. A syntactically correct but testably incorrect compound refactoring that can be applied is shown. Referring initially to FIG. 4, an original code segment 45 is shown and includes two non-parameterized conditional statements, if (key.equals ("DESC")) {something( );} and if (key.equals(foo( )))

{something( );}, that represent potentially duplicated code. Referring next to FIG. 5, a first refactored code segment 50 is shown. The pair of conditional statements have been refactored by removing the conditional test values into separate assignment statements, string temp1 "DESC"; and string temp1=foo( );, and replacing the test values by the local variable temp1. This first refactoring can be measured for relative improvement, degradation or status quo and assigned a quantitative measure, such as an amount of or degree of change. Referring finally to FIG. 6, a second refactored code segment 60 is shown. The assignment statement, string key=tok.next( ), has been "bubbled" downwards, attempting to increase the number of sequential identical statements the two code fragments have in common. This second refactoring can also be measured for relative improvement, degradation or status quo and assigned a quantitative measure.

While syntactically correct, the validity of this refactoring cannot be determined unless verified by testing or by programmer inspection, because the reordering of the calls to foo( ) and tok.next( ) may or may not be valid. The refactoring might be invalid, for example, if the method foo( ) itself accesses or changes the state of the token input stream. An aggregate quantitative measure is assigned, such as through a vector, to reflect the overall effect of the refactoring. For example, the first application of a refactoring resulted in an overall decrease in code complexity through the parameterizing of conditional test values but increase in code length, which can be reflected as a neutral change. The second application of a refactoring, though, resulted in a degradation of the code by introducing a runtime error, which can be reflected as a negative change. Thus, the vector for the refactoring is (0, −5), where −5 represents a quantitative measure for introducing a runtime error. Other forms of individual and aggregate quantitative measures of refactorings are possible.

Figure 7:
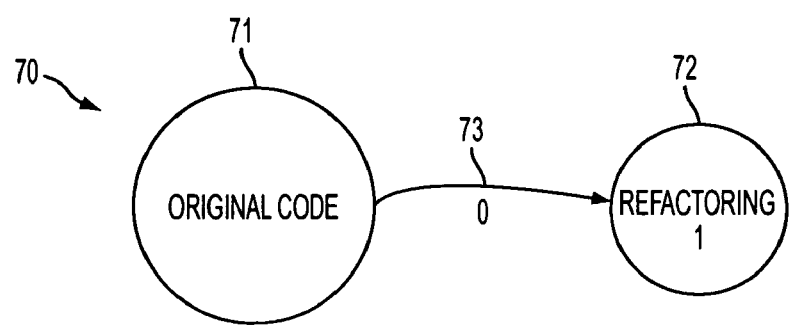
FIGS. 7-8 are graph diagrams showing, by way of example, constituent refactorings for a candidate compound refactoring as depicted in a logically-defined graphical search space.
Figure 8:
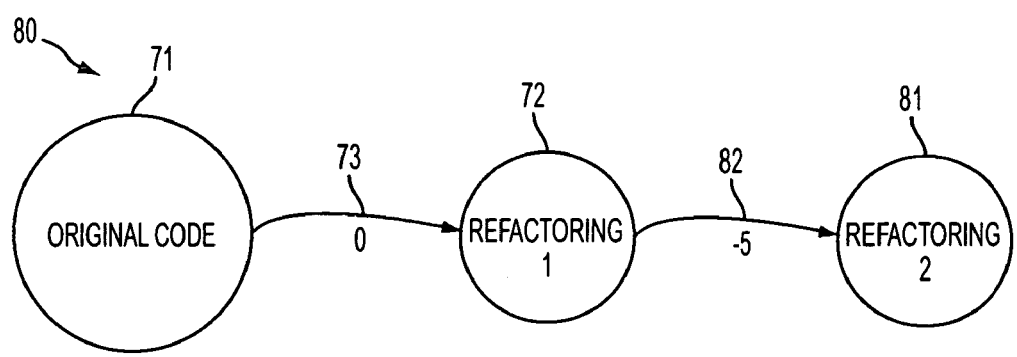

FIGS. 7-8 are graph diagrams showing, by way of example, constituent refactorings 39 for a candidate compound refactoring 37 as depicted in a logically-defined graphical search space. Referring first to FIG. 7, the state of the original code segment 45 and the first refactored code segment 50 are respectively shown as nodes 71, 72 in a logically defined graphical search space 70. The relative difference between the states of the original code segment 45 and the refactored code segment 50 are represented as a weight assigned to a directed edge 73 from node 71 to node 72. The weight reflects the improvement, degradation or status quo of the first refactoring. Referring next to FIG. 8, the state of the second refactored code segment 60 is shown as node 81. The relative difference between the states of the first refactored code segment 50 and the second refactored code segment 60 are represented as a weight assigned to a directed edge 82 from node 72 to node 81.

The relative differences, as reflected in the assigned weights, reflect the quantitative metrics 39, which are used to quantitatively measure the actual and potential differences of the original code 35 and refactored code 36. The search space is progressively built with each successive application of a refactoring 38 and the relative differences can be cumulatively accrued on a per-refactoring basis or aggregated upon completion of a series of refactorings, such as may occur when no further refactorings can be found for the program code. The quantitative metrics 39 can be applied as a threshold for presentation of a refactoring 37 to developers or to determine which of two or more refactorings 38 has a higher priority for presentation to developers. In addition, quantitative metrics 39 can reflect the potential of a refactoring 38 for use in a further refactoring. Other types of quantitative metrics and graphical representations are possible.

Method

Figure 9:
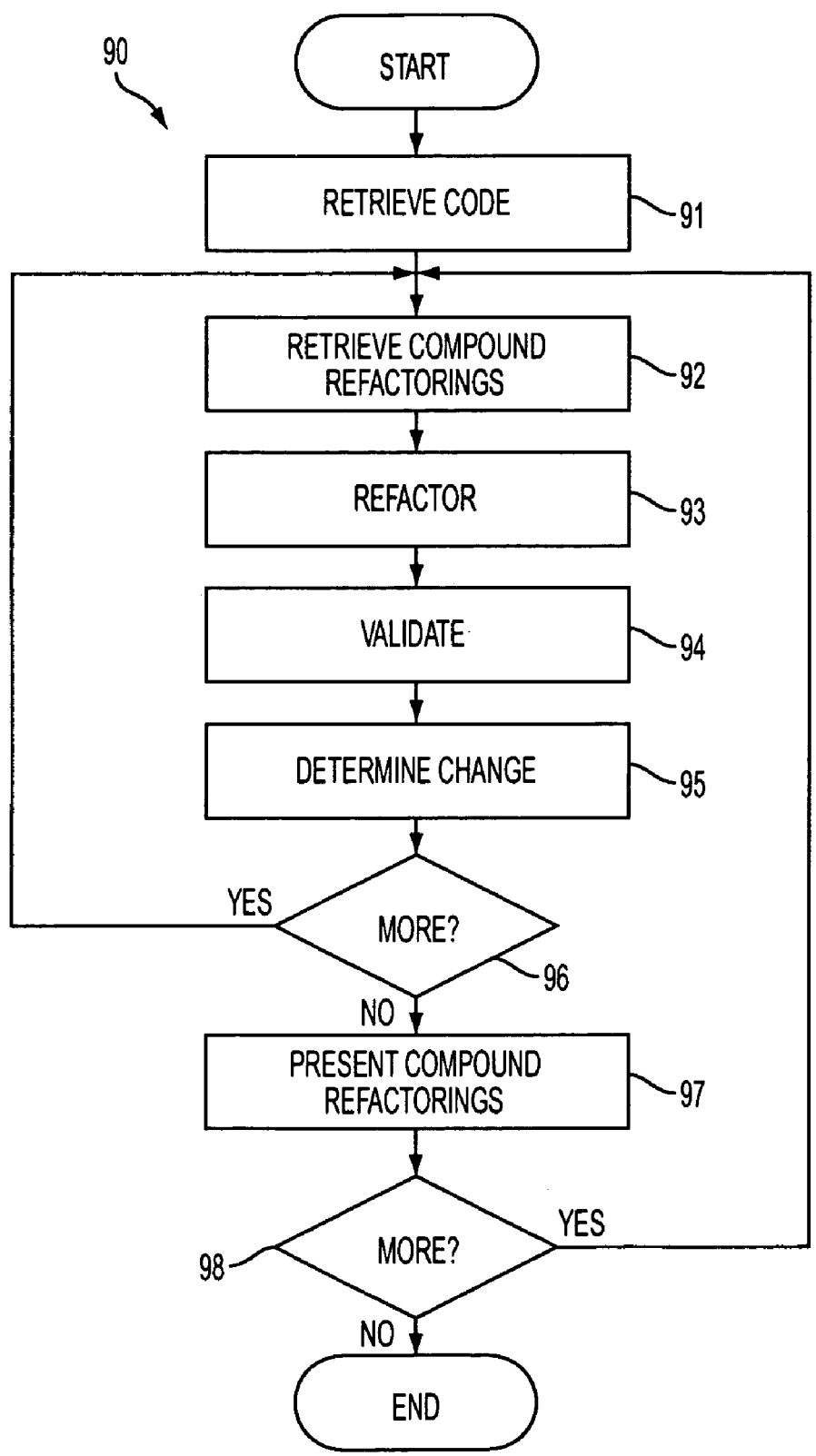
FIG. 9 is a flow diagram showing a method for automatically identifying compound refactorings of program code through quantitative metric analysis, in accordance with one embodiment.

FIG. 9 is a flow diagram 90 showing a method for automatically identifying compound refactorings of program code 16 through quantitative metric analysis, in accordance with one embodiment. The purpose of the method is to automatically refactor program code using individual constituent refactorings 38 to identify compound refactorings 37 worthy of presenting to developers working in an automated refactoring environment. The method is described as a sequence of process operations or steps, which can be executed, for instance, by a development platform 11.

Initially, the original program code 34 to be refactored is retrieved (block 91). In one embodiment, the program code 34 is written in an object-oriented programming language in conjunction with a framework. Next, one or more compound refactorings 37 are retrieved from the repository (block 92). The repository is initially seeded with a single compound refactoring 37 with zero simple refactorings 38. The program code 34 is then refactored through the application of the constituent refactorings 38 (block 93) selected from the compound refactorings 37. The refactorings are validated (block 94) and the relative change between the original program code 34 and the refactored program code 35 is determined as quantitative measures 38 (block 95). Further refactorings can be performed (block 96), for instance, if the refactorings are being evaluated against a threshold 40 or minimum degree of change. In a further embodiment, the quantitative measures are analyzed through, for example, a logically-defined graphical search space evaluated through searching methodologies, including hill climbing, estimation and goal direction. The compound refactorings 37 can be presented to the developers if sufficiently acceptable, such as reflected by the quantitative metrics 39 (block 97). Still further refactorings can be performed (block 98).

While the invention has been particularly shown and described as referenced to the embodiments thereof, those skilled in the art will understand that the foregoing and other changes in form and detail may be made therein without departing from the spirit and scope.

What is claimed is:

1. A system for automatically identifying compound refactorings of program code through quantitative metric analysis, comprising:

a memory to store original program code comprising program statements written in a structured programming language;

a repository to maintain one or more compound refactorings, which each comprise one or more individual refactorings operable on program statements written in the structured programming language;

a refactoring engine to automatically refactor the original program code, comprising:

a refactoring applier to generate refactored program code by applying combinations of one or more of the compound refactorings to the program statements in the original program code;

a code validator to validate the refactored code;

an evaluator to determine differences, upon successful validation, between the program statements in both the original program code and the refactored program code and to assign weights to the compound refactorings in each combination of the compound refactorings applied that quantify the differences; and a quantitative measurer to determine a quantitative metric cumulatively over the weights of the compound refactorings in each combination of the compound refactorings applied, and to compare the quantitative metric for each of the combinations of the compound refactorings applied against a threshold as an indication of a relative difference between the program statements prior to and after the refactoring due to that combination; and a display to periodically present the combinations of the compound refactorings applied.

2. A system according to claim 1, wherein the quantitative metric is quantified as at least one of a determinant of whether the refactoring should be presented and which of two or more refactorings should be presented.

3. A system according to claim 1, wherein the quantitative metric is quantified as an estimator of further refactorings.

4. A system according to claim 1, wherein the application of the refactorings is validated by performing at least one of a proof, static analysis and a test suite.

5. A system according to claim 1, wherein the quantitative metric is selected from the group comprising code size, cyclomatic complexity, and cohesion and coupling.

6. A system according to claim 1, wherein the weights assigned to the compound refactorings in each combination of the compound refactorings applied reflect one of an improvement, degradation, or status quo over the program statements in the original program code.

7. A system according to claim 1, wherein the compound refactorings in each combination of the compound refactorings applied are selected by performing at least one of hill climbing, estimation and goal direction over a logically-defined graphical search space of the compound refactorings.

8. A system according to claim 1, further comprising:
a threshold evaluator to evaluate a degree of relative improvement of the quantitative metric using the indication of the relative difference.

9. A system according to claim 1, wherein the refactorings are integrated through a framework defining testing functionality and comprising program statements written in accordance with the programming language.

10. A system according to claim 1, wherein the combinations of the compound refactorings applied are exposed through a user interface.

11. A system according to claim 1, wherein the programming language comprises an object oriented programming language.

12. A method for automatically identifying compound refactorings of program code through quantitative metric analysis, comprising:
maintaining original program code comprising program statements written in a structured programming language;
maintaining one or more compound refactorings, which each comprise one or more individual refactorings operable on program statements written in the structured programming language; and
automatically refactoring the original program code, comprising:
generating refactored program code by applying combinations of one or more of the compound refactorings to the program statements in the original program code;
validating the refactored program code;
upon successful validation, determining differences between the program statements in both the original program code and the refactored program code and assigning weights to the compound refactorings in each combination of the compound refactorings applied that quantify the differences; and
determining a quantitative metric cumulatively over the weights of the compound refactorings in each combination of the compound refactorings applied; and
comparing the quantitative metric for each of the combinations of the compound refactorings applied against a threshold as an indication of a relative difference between the program statements prior to and after the refactoring due to that combination.

13. A method according to claim 12, further comprising:
quantifying the quantitative metric as at least one of a determinant of whether the refactoring should be presented and which of two or more refactorings should be presented.

14. A method according to claim 12, further comprising:
quantifying the quantitative metric as an estimator of further refactorings.

15. A method according to claim 12, further comprising:
validating the application of the refactorings by performing at least one of a proof, static analysis and a test suite.

16. A method according to claim 12, wherein the quantitative metric is selected from the group comprising code size, cyclomatic complexity, and cohesion and coupling.

17. A method according to claim 12, further comprising:
basing the weights assigned to the compound refactorings in each combination of the compound refactorings applied reflect one of an improvement, degradation, or status quo over the program statements in the original program code.

18. A method according to claim 17, further comprising:
selecting the compound refactorings in each combination of the compound refactorings applied by performing at least one of hill climbing, estimation and goal direction over a logically-defined graphical search space of the compound refactorings.

19. A method according to claim 12, further comprising:
evaluating a degree of relative improvement of the quantitative metric using the indication of the relative difference.

20. A method according to claim 12, further comprising:
integrating the refactorings through a framework defining testing functionality and comprising program statements written in accordance with the programming language.

21. A method according to claim 12, further comprising:
exposing the combinations of the compound refactorings applied through a user interface.

22. A method according to claim 12, wherein the programming language comprises an object oriented programming language.

23. A computer-readable storage medium holding code for performing the method according to claim 12.

* * * * *